(12) United States Patent
Dube et al.

(10) Patent No.: US 11,219,244 B2
(45) Date of Patent: Jan. 11, 2022

(54) TOBACCO-DERIVED CARBON MATERIAL

(71) Applicant: R.J. REYNOLDS TOBACCO COMPANY, Winston-Salem, NC (US)

(72) Inventors: Michael Francis Dube, Winston-Salem, NC (US); Thomas Albert Perfetti, Winston-Salem, NC (US); Rick Lehman, Princeton, NJ (US); Bob Horvath, Princeton, NJ (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 1058 days.

(21) Appl. No.: 14/579,409

(22) Filed: Dec. 22, 2014

(65) Prior Publication Data

US 2016/0174605 A1   Jun. 23, 2016

(51) Int. Cl.
*A24D 3/06*   (2006.01)
*A24D 3/16*   (2006.01)
(Continued)

(52) U.S. Cl.
CPC .............. *A24D 3/06* (2013.01); *A24D 1/08* (2013.01); *A24D 1/22* (2020.01); *A24D 3/163* (2013.01);
(Continued)

(58) Field of Classification Search
None
See application file for complete search history.

(56) References Cited

U.S. PATENT DOCUMENTS

| 4,244,381 A | 1/1981 | Lendvay |
| 4,714,082 A | 12/1987 | Banerjee et al. |

(Continued)

FOREIGN PATENT DOCUMENTS

| CN | 1324586 | 12/2001 |
| CN | 1 669 918 | 9/2005 |

(Continued)

OTHER PUBLICATIONS

S. Gaspard, S. Altenor, E.A. Dawson, P.A. Barnes, A. Ouensanga, "Activated carbon from vetiver roots: Gas and liquid adsorption studies", Journal of Hazardous Materials, vol. 144, Issues 1-2, pp. 73-81, https://doi.org/10.1016/j.jhazmat.2006.09.089. (Year: 2007).*

(Continued)

*Primary Examiner* — Michael J Felton
(74) *Attorney, Agent, or Firm* — Womble Bond Dickinson (US) LLP

(57) ABSTRACT

A method of forming a carbon material from the stalk or roots of a plant of the *Nicotiana* species is provided herein, wherein the method includes i) receiving a tobacco material comprising at least one of a stalk material and a root material of a harvested plant of the *Nicotiana* species; and ii) pyrolyzing the tobacco material to remove volatiles and to form a tobacco-derived carbon material. Optionally, the method can further include activating the tobacco-derived carbon material. The tobacco-derived carbon material can be incorporated into a tobacco product. A carbon material derived from pyrolyzing a tobacco material in the form of at least one of a tobacco stalk material and a tobacco root material of a harvested plant of the *Nicotiana* species is also provided herein.

8 Claims, 4 Drawing Sheets

(51) Int. Cl.
 A24D 1/22 (2020.01)
 A24D 1/08 (2006.01)
 C01B 32/336 (2017.01)
 C01B 32/342 (2017.01)
 C01B 32/30 (2017.01)
 C01B 32/05 (2017.01)
 C01B 32/318 (2017.01)
(52) U.S. Cl.
 CPC .............. *C01B 32/05* (2017.08); *C01B 32/30* (2017.08); *C01B 32/318* (2017.08); *C01B 32/336* (2017.08); *C01B 32/342* (2017.08); *C01P 2006/12* (2013.01)

(56) References Cited

U.S. PATENT DOCUMENTS

| | | | |
|---|---|---|---|
| 4,756,318 A | 7/1988 | Clearman et al. | |
| 4,771,795 A | 9/1988 | White et al. | |
| 4,881,556 A | 11/1989 | Clearman et al. | |
| 4,922,901 A | 5/1990 | Brooks et al. | |
| 4,989,619 A | 2/1991 | Clearman et al. | |
| 5,020,548 A | 6/1991 | Farrier et al. | |
| 5,027,837 A | 7/1991 | Clearman et al. | |
| 5,064,805 A * | 11/1991 | Otowa | C01B 32/348 502/180 |
| 5,067,499 A | 11/1991 | Banerjee et al. | |
| 5,076,297 A | 12/1991 | Farrier et al. | |
| 5,099,861 A | 3/1992 | Clearman et al. | |
| 5,105,831 A | 4/1992 | Banerjee et al. | |
| 5,129,409 A | 7/1992 | White et al. | |
| 5,148,821 A | 9/1992 | Best et al. | |
| 5,156,170 A | 10/1992 | Clearman et al. | |
| 5,178,167 A | 1/1993 | Riggs et al. | |
| 5,211,684 A | 5/1993 | Shannon et al. | |
| 5,247,947 A | 9/1993 | Clearman et al. | |
| 5,345,955 A | 9/1994 | Clearman et al. | |
| 5,360,023 A | 11/1994 | Blakley et al. | |
| 5,469,871 A | 11/1995 | Barnes et al. | |
| 5,551,451 A | 9/1996 | Riggs et al. | |
| 5,560,376 A | 10/1996 | Meiring et al. | |
| 5,727,571 A | 3/1998 | Meiring et al. | |
| 7,240,678 B2 | 7/2007 | Crooks et al. | |
| 8,079,369 B2 | 12/2011 | Andresen et al. | |
| 8,119,555 B2 | 2/2012 | Banerjee et al. | |
| 8,375,958 B2 | 2/2013 | Hutchens | |
| 8,434,496 B2 | 5/2013 | Chen et al. | |
| 8,464,726 B2 | 6/2013 | Sebastian et al. | |
| 8,511,319 B2 | 8/2013 | Sears et al. | |
| 8,563,467 B2 | 10/2013 | Hashisho et al. | |
| 8,893,725 B2 | 11/2014 | Dube et al. | |
| 8,944,072 B2 | 2/2015 | Chen et al. | |
| 8,991,403 B2 | 3/2015 | Chen et al. | |
| 2005/0274390 A1 | 12/2005 | Banerjee et al. | |
| 2007/0056600 A1 | 3/2007 | Coleman, III et al. | |
| 2007/0113736 A1 | 5/2007 | Bandosz | |
| 2007/0193596 A1 | 8/2007 | Mori et al. | |
| 2008/0233294 A1 | 9/2008 | Lobovsky et al. | |
| 2008/0295853 A1 | 12/2008 | Jones | |
| 2009/0044818 A1 | 2/2009 | Takeuchi et al. | |
| 2009/0090373 A1 | 4/2009 | Borschke et al. | |
| 2011/0108044 A1 | 5/2011 | Norman et al. | |
| 2012/0037173 A1 | 2/2012 | Clark et al. | |
| 2012/0152265 A1 | 6/2012 | Dube et al. | |
| 2012/0192880 A1 | 8/2012 | Dube et al. | |
| 2012/0255569 A1 | 10/2012 | Beard et al. | |
| 2013/0014771 A1 | 1/2013 | Coleman, III et al. | |
| 2013/0081643 A1 | 4/2013 | Branton et al. | |
| 2013/0276801 A1 | 10/2013 | Byrd, Jr. et al. | |
| 2015/0040922 A1 | 2/2015 | Dube et al. | |

FOREIGN PATENT DOCUMENTS

| | | | |
|---|---|---|---|
| CN | 1 821 071 | | 8/2006 |
| CN | 101 508 434 | | 8/2009 |
| CN | 10231113 | | 1/2012 |
| CN | 103 121 682 | | 5/2013 |
| CN | 105146754 A | * | 12/2015 |
| JP | 1162008 | | 10/1997 |
| WO | WO 03/059096 | | 7/2003 |
| WO | WO 2014/077714 | | 5/2014 |

OTHER PUBLICATIONS

Colby, Frank, G., "Use of Tobacco Roots in Tobacco Products", 1975, RJ Reynolds, https://www.industrydocuments.ucsf.edu/docs/zlby0093 (Year: 1975).*

Duke, MG. Activated Carbon Seminar. Dec. 2, 1987 (added to UCSF Aug. 2, 2005). British American Tobacco Records. Unknown. https://www.industrydocuments.ucsf.edu/docs/jncy0204 (Year: 2005).*

Kleszyk el al., (Accepted Manuscript) "Carbons with Narrow Pore Size Distribution Prepared by Simultaneous Carbonization and Self-Activation of Tobacco Stems and Their Application to Supercapacitors," *Carbon*, 2014, doi: http://dx.doi.org/10.1016/j.carbon.2014.09.043.

Makeswari et al, "Optimization of Preparation of Activated Carbon From *Ricinus communis* Leaves by Microwave-Assisted Zinc Chloride Chemical Activation: Competitive Adsorption of Ni2+ Ions From Aqueous Solultion, " *Journal of Chemistry*, 2012, pp. 1-12, vol. 2013, Article 1D 314790, 12 pages.

Xia et al., "Tobacco Stem-Based Activated Carbons for High Performance Supercapacitors," *Journal of Materials Engineering and Performance*, 2012, pp. 1956-1961, vol. 21, Issue 9.

* cited by examiner

TOBACCO-DERIVED CARBON MATERIAL

FIELD OF THE INVENTION

The present invention relates to products made or derived from tobacco, or that otherwise incorporate tobacco or components of tobacco. Of particular interest are ingredients or components obtained or derived from the stalk or roots of a plant of the *Nicotiana* species.

BACKGROUND OF THE INVENTION

Cigarettes, cigars, and pipes are popular smoking articles that employ tobacco in various forms. Such smoking articles are employed by heating or burning tobacco to generate aerosol (e.g., smoke) that may be inhaled by the smoker. Popular smoking articles, such as cigarettes, have a substantially cylindrical rod shaped structure and include a charge, roll or column of smokable material such as shredded tobacco (e.g., in cut filler form) surrounded by a paper wrapper thereby forming a so-called "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate a filter element having multiple segments, and one of those segments can comprise activated charcoal particles. Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A cigarette is employed by a smoker by lighting one end thereof and burning the tobacco rod. The smoker then receives mainstream smoke into his/her mouth by drawing on the opposite end (e.g., the filter end) of the cigarette.

The tobacco used for cigarette manufacture is typically used in blended form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. However, for many tobacco blends, flue-cured tobacco makes up a relatively large proportion of the blend, while Oriental tobacco makes up a relatively small proportion of the blend. See, for example, *Tobacco Encyclopedia*, Voges (Ed.) p. 44-45 (1984), Browne, *The Design of Cigarettes*, 3$^{rd}$ Ed., p. 43 (1990) and *Tobacco Production, Chemistry and Technology*, Davis et al, (Eds.) p. 346 (1999).

Tobacco also may be enjoyed in a so-called "smokeless" form. Particularly popular smokeless tobacco products are employed by inserting some form of processed tobacco or tobacco-containing formulation into the mouth of the user. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; 2005/0115580 to Quinter et al.; 2005/0244521 to Strickland et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0029117 to Mua et al.; 2008/0173317 to Robinson et al.; 2008/0196730 to Engstrom et al.; 2008/0209586 to Neilsen et al.; 2008/0305216 to Crawford et al.; 2009/0025738 to Mua et al.; 2009/0025739 to Brinkley et al.; 2009/0065013 to Essen et al.; 2009/0293889 to Kumar et al.; 2010/0018540 to Doolittle et al; 2010/0018541 to Gerardi et al.; 2010/0291245 to Gao et al; 2011/0139164 to Mua et al.; 2011/0174323 to Coleman, III et al.; 2011/0247640 to Beeson et al.; 2011/0259353 to Coleman, III et al.; 2012/0037175 to Cantrell et al.; 2012/0055494 to Hunt et al.; 2012/0103353 to Sebastian et al.; 2012/0125354 to Byrd et al.; 2012/0138073 to Cantrell et al.; and 2012/0138074 to Cantrell et al; PCT WO 04/095959 to Arnarp et al.; PCT WO 05/063060 to Atchley et al.; PCT WO 05/004480 to Engstrom; PCT WO 05/016036 to Bjorkholm; PCT WO 05/041699 to Quinter et al., and PCT WO 10/132444 to Atchley; each of which is incorporated herein by reference.

One type of smokeless tobacco product is referred to as "snuff." Representative types of moist snuff products, commonly referred to as "snus," have been manufactured in Europe, particularly in Sweden, by or through companies such as Swedish Match AB, Fiedler & Lundgren AB, Gustavus AB, Skandinavisk Tobakskompagni A/S, and Rocker Production AB. Snus products available in the U.S.A. have been marketed under the tradenames Camel Snus Frost, Camel Snus Original and Camel Snus Spice by R. J. Reynolds Tobacco Company. See also, for example, Bryzgalov et al., 1N1800 Life Cycle Assessment, Comparative Life Cycle Assessment of General Loose and Portion Snus (2005). In addition, certain quality standards associated with snus manufacture have been assembled as a so-called GothiaTek standard. Representative smokeless tobacco products also have been marketed under the tradenames Oliver Twist by House of Oliver Twist A/S; Copenhagen moist tobacco, Copenhagen pouches, Skoal Bandits, Skoal Pouches, SkoalDry, Rooster, Red Seal long cut, Husky, and Revel Mint Tobacco Packs by U.S. Smokeless Tobacco Co.; Marlboro Snus and "taboka" by Philip Morris USA; Levi Garrett, Peachy, Taylor's Pride, Kodiak, Hawken Wintergreen, Grizzly, Dental, Kentucky King, and Mammoth Cave by American Snuff Company, LLC; Camel Snus, Camel Orbs, Camel Sticks, and Camel Strips by R. J. Reynolds Tobacco Company. Other exemplary smokeless tobacco products that have been marketed include those referred to as Kayak moist snuff and Chattanooga Chew chewing tobacco by Swisher International, Inc.; and Redman chewing tobacco by Pinkerton Tobacco Co. LP.

It would be desirable to provide additional uses for the remaining parts of the tobacco plants. In particular, it would be advantageous to develop products derived from tobacco biomass, specifically from the stalk or roots of a plant of the *Nicotiana* species.

SUMMARY OF THE INVENTION

The present invention provides methods for forming a carbon material from the stalk or roots of a plant of the *Nicotiana* species. The method can comprise i) receiving a tobacco material comprising at least one of a stalk material and a root material of a harvested plant of the *Nicotiana* species; and ii) pyrolyzing the tobacco material to remove volatiles and to form a tobacco-derived carbon material. In various embodiments, the tobacco material can be formed by grinding at least one of the stalk material and the root material of a harvested plant of the *Nicotiana* species to form a particulate material. In addition, the tobacco material can comprise at least about 90 percent by dry weight of at least one of the stalk material and the root material of the harvested plant of the *Nicotiana* species.

In various embodiments of the methods described herein, the tobacco material can comprise at least about 40 dry weight percent carbon, at least about 42% carbon, or at least about 45% carbon by dry weight percentage of the harvested tobacco material.

For various embodiments of the methods described herein, pyrolyzing the tobacco material can result in a yield of tobacco-derived carbon material of about 15% or greater, about 20% or greater, about 25% or greater, or about 30% or greater based on the initial dry weight of the tobacco material. The tobacco-derived carbon material can comprise a char product and an ash product. Furthermore, the tobacco-derived carbon material can comprise an ash content of about 15% or less by dry weight, about 10% or less, or about 5% or less, based on the total dry weight of the pyrolyzed tobacco materials (i.e., the solid residue remaining after pyrolysis).

In several embodiments, methods of the present invention can further comprise incorporating the tobacco-derived carbon material into a tobacco product. The tobacco product can be, for example, in the form of a smoking article comprising a combustible fuel element adapted for lighting, wherein the fuel element comprises the tobacco-derived carbon material.

In various embodiments of methods described herein, the method can further comprise activating the tobacco-derived carbon material. For example, the tobacco-derived carbon material can be activated through at least one of alkali activation and steam activation. One exemplary activation method comprises fluxing a tobacco-derived char with an alkali metal compound (e.g., potassium hydroxide or sodium hydroxide) in a mass ratio of about 1:1 to about 3:1 alkali metal compound/char at a temperature of greater than about 800° C. (e.g., greater than about 825° C. or greater than about 850° C.). The activated tobacco-derived carbon material will typically have a surface area of at least about 400 m$^2$/g, such as about 500 to about 1,200 m$^2$ g.

In several embodiments, methods of the present invention can further comprise incorporating the activated tobacco-derived carbon material into a tobacco product. The tobacco product can be a smoking article, for example. In various embodiments, the smoking article can comprise a filter element comprising the activated tobacco-derived carbon material.

Additionally, tobacco-derived carbon from tobacco stalks and/or roots can be used, for example, in gas purification, decaffeination, denicotinization, gold purification, metal extraction, water purification, medicine, sewage treatment, air filters in gas masks and respirators, filters for compressed air, and in many other applications. Tobacco-derived carbon can also be used as a black pigment for printing, for example.

The present invention also provides a carbon material derived from pyrolyzing tobacco material comprising at least one of a tobacco stalk material and a tobacco root material of a harvested plant of the *Nicotiana* species. The tobacco material can comprise at least about 90 percent by dry weight of at least one of the stalk material and the root material of the harvested plant of the *Nicotiana* species.

Before pyrolyzing, the tobacco material comprising at least one of a tobacco stalk material and a tobacco root material can comprise at least about 40 dry weight percent carbon, at least about 42% carbon, or at least about 45% carbon by dry weight percentage of the harvested tobacco material.

In several embodiments, tobacco products incorporating the carbon material can be provided. The tobacco product can be, for example, in the form of a smoking article comprising a combustible fuel element adapted for lighting, wherein the fuel element comprises the carbon material.

In various embodiments of the present invention, the carbon material can be optionally activated. For example, the carbon material can be activated through at least one of alkali activation and steam activation. In various embodiments, a tobacco product incorporated the activated carbon material can be provided. In certain embodiments, the tobacco product can be a smoking article. The smoking article can comprise a filter element comprising the activated carbon material.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1:
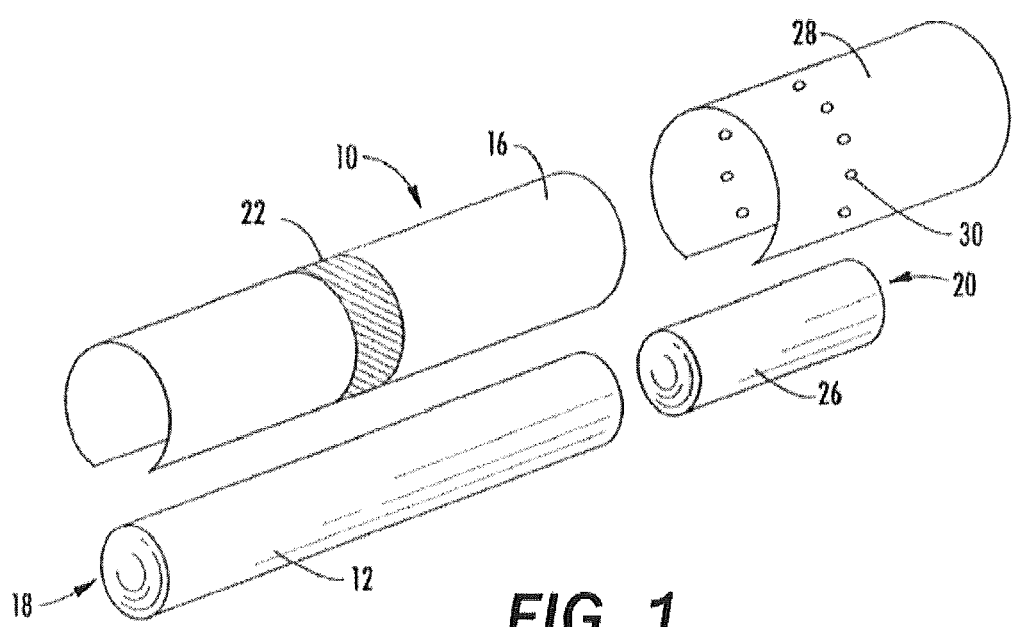
FIG. 1 is an exploded perspective view of a smoking article having the form of a cigarette, showing the smokable material, the wrapping material components, and the filter element of the cigarette.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

The present invention provides a carbon material derived from pyrolyzed tobacco material comprising at least one of a tobacco stalk material and a tobacco root material of a harvested plant of the *Nicotiana* species. The invention also provides methods for forming a carbon material from the stalk or roots of a plant of the *Nicotiana* species.

Preparation of a tobacco material according to the present invention comprises harvesting a plant from the *Nicotiana* species and, in certain embodiments, separating certain components from the plant such as the stalks and/or roots, and physically processing these components. Although whole tobacco plants or any component thereof (e.g., leaves, flowers, stems, roots, stalks, and the like) could be used in the invention, it is advantageous to use stalks and/or roots of the tobacco plant. The remainder of the description focuses on use of stalks and/or roots from the plant, but the invention is not limited to such embodiments.

The tobacco stalks and/or roots can be separated into individual pieces (e.g., roots separated from stalks, and/or root parts separated from each other, such as big root, mid root, and small root parts) or the stalks and roots may be combined. By "stalk" is meant the stalk that is left after the leaf (including stem and lamina) has been removed. "Root" and various specific root parts useful according to the present invention may be defined and classified as described, for example, in Mauseth, Botany: An Introduction to Plant Biology: Fourth Edition, Jones and Bartlett Publishers (2009) and Glimn-Lacy et al., Botany Illustrated, Second Edition, Springer (2006), which are incorporated herein by reference. The harvested stalks and/or roots are typically cleaned, ground, and dried to produce a material that can be described as particulate (i.e., shredded, pulverized, ground, granulated, or powdered). As used herein, stalks and/or roots can also refer to stalks and/or roots that have undergone an extraction process to remove water soluble materials. The cellulosic material (i.e., pulp) remaining after stalks and/or root materials undergo an extraction process can also be useful in the present invention.

The stalks and/or roots of a plant of the *Nicotiana* species can comprise a higher percentage of carbon than the stems of the plant. For example, in various embodiments, the stalks and/or roots of a plant of the *Nicotiana* species can comprise at least about 40% carbon, at least about 42% carbon, or at least about 45% carbon by dry weight percentage of the harvested tobacco material. However, the stems of the plant of the *Nicotiana* species typically comprise less than about 40% carbon by dry weight percentage of the harvested tobacco stems. For the purposes of producing a carbon material, the higher percentage of carbon found in stalks and roots of a plant of the *Nicotiana* species make these portions of the plant a better starting material than harvested tobacco stems. The stalks and roots are a more efficient starting material as compared to tobacco stems because the stalks and/or roots return a higher yield of carbon material upon pyrolysis.

Additionally, tobacco stems represent a valuable starting material for the preparation of tobacco reconstituted sheet and expanded stem materials used in tobacco products. Use of tobacco stems as a source for carbon would decrease the supply of tobacco stems that can be used in other tobacco manufacturing processes. Tobacco stalks and roots represent a tobacco material not otherwise used in tobacco manufacturing and as such, represent an excellent raw material for the preparation of tobacco-derived carbon. An additional tobacco raw material that is otherwise not used in tobacco manufacturing is so-called tobacco dust (i.e., a very small particle tobacco material collected during cigarette manufacturing) and so-called stemmery dust (i.e., a tobacco-derived material collected during the stemming of the tobacco leaves). Tobacco dust and stemmery dust can also be used to produce a carbon material.

Although the tobacco material may comprise material from any part of a plant of the *Nicotiana* species, the majority of the material typically comprises material obtained from the stalks and/or roots of the plant. For example, in certain embodiments, the tobacco material comprises at least about 90%, at least about 92%, at least about 95%, or at least about 97% by dry weight of at least one of the stalk material and the root material of a harvested plant of the *Nicotiana* species.

Preferably, the physical processing step comprises comminuting, grinding, and/or pulverizing stalks and/or roots from a *Nicotiana* plant into particulate form using equipment and techniques for grinding, milling, or the like. In certain preferred embodiments, the stalks and/or roots are dried prior to the physical processing step, and thus are relatively dry in form during grinding or milling. For example, the stalks and/or roots can be ground or milled when the moisture content thereof is less than about 15 weight percent or less than about 5 weight percent. In such embodiments, equipment such as hammer mills, cutter heads, air control mills, or the like may be used.

The manner by which the stalks and/or roots are provided in such a form can vary. For example, material obtained from *Nicotiana* plant stalks can be isolated and treated separately from material obtained from *Nicotiana* plant roots. Material from various parts of the stalks and/or roots can be isolated and treated separately (for example, material derived from different parts of the root can be kept separate throughout the processing). In some embodiments, material from different parts of the *Nicotiana* plant can be combined and processed together, thereby forming a single homogenous tobacco material. In some embodiments, material from different parts of the *Nicotiana* plant are isolated and treated separately and combined at some stage of the processing to give a single tobacco product.

The tobacco material provided following the comminuting, grinding, and/or pulverizing of *Nicotiana* stalks and/or roots can have any particle size and particle size distribution, the maximum size limited only by the pyrolysis apparatus. In practice, wherein the pyrolysis is done in commercial reactors, the maximum size might approach that of unpulverized stalks and roots. More preferably, the comminuted product can have an average particle size of about 20 cm or less, about 15 cm or less, about 10 cm or less, about 5 cm or less, or about 2 cm or less. Most preferably, the comminuted product average particle size can be in a range such that 80% by weight has a largest dimension between about 0.5 cm and about 5.0 cm, or about 0.5 cm and about 2.0 cm. The minimum particle size, to the extent that it is limited at all, is limited by dust and segregation issues such that not more than 5% of the comminuted product is less than 100 mesh (approximately 150 micrometers), In various embodiments, after carbonization, the longer tobacco stalks and/or roots can be reduced in particle size such that parts or pieces thereof have an average particle size less than or equal to about 5 mm, less than or equal to about 2 mm, less than or equal to about 1 mm, less than or equal to about 500 microns, or less than or equal to about 100 microns.

In certain embodiments, the tobacco material can be treated with water to extract an aqueous soluble component of the tobacco material therefrom. In some preferred embodiments, the particulate or powder tobacco material can be combined with water to form a moist aqueous material (e.g., in the form of a suspension or slurry) and the resulting material is typically heated to effectuate extraction of various compounds. The water used to form the moist material can be pure water (e.g., tap water or deionized water) or a mixture of water with suitable co-solvents such as certain alcohols. In certain embodiments, the amount of water added to form the moist material can be at least about 50 weight percent, or at least about 60 weight percent, or at least about 70 weight percent, based on the total weight of the moist material. In some cases, the amount of water can be described as at least about 80 weight percent or at least about 90 weight percent.

The extract thus produced may comprise some level of solid (insoluble) material entrained in the liquid. Accordingly, "extract" is intended to mean the material obtained upon contacting the stalks and/or roots with water and may comprise both soluble components dissolved therein and solid dispersed components. Following the extraction process, the extracted liquid component is typically filtered to remove at least some of the solids. In other words, some or all of the portion of the tobacco material insoluble in the aqueous solvent is removed. The process of filtration can comprise passing the liquid through one or more filter screens to remove selected sizes of particulate matter. Screens may be, for example, stationary, vibrating, rotary, or any combination thereof. Filters may be, for example, press filters or pressure filters. In some embodiments, the filtration method used can involve microfiltration, ultrafiltration, and/or nanofiltration. A filter aid can be employed to provide effective filtration and can comprise any material typically used for this purpose. For example, some common filter aids include cellulose fibers, perlite, bentonite, diatomaceous earth, and other silaceous materials. To remove solid components, alternative methods can also be used, for example, centrifugation or settling/sedimentation of the components and siphoning off of the liquid. The extracted solid components can then be used as the starting tobacco material in various embodiments of the invention described herein.

The exact composition of the tobacco material produced according to the present invention can vary. The composition may depend, in part, on whether the tobacco material is prepared from *Nicotiana* stalks, roots, or a combination thereof. Tobacco material prepared solely from material obtained from *Nicotiana* stalks may exhibit different characteristics than tobacco material prepared solely from material obtained from *Nicotiana* roots. Similarly, tobacco material prepared from material obtained from certain parts of one of these components may exhibit different characteristics than material obtained from other parts of this component (e.g., tobacco material prepared from mid-root material may be different from tobacco material prepared from big root material). For example, in certain embodiments, tobacco material derived from *Nicotiana* stalk has a higher content of volatile compounds than tobacco material derived from *Nicotiana* root.

The selection of the plant from the *Nicotiana* species utilized in the process of the invention can vary; and in particular, the types of tobacco or tobaccos can vary. The type of tobacco used as the source of tobacco stalks and/or roots from which the tobacco material is derived can vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and *Rustica* tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. Various representative types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al. and U.S. Pat. No. 7,025,066 to Lawson et al.; US Patent Appl. Pub. Nos. 2006/0037623 to Lawrence, Jr. and 2008/0245377 to Marshall et al.; each of which is incorporated herein by reference.

The particular *Nicotiana* species of material used in the invention could also vary. Of particular interest are *N alata, N. arentsii, N. excelsior, N. forgetiana, N. glauca, N glutinosa, N gossei, N. kawakamii, N knightiana, N. langsdorffi, N otophora, N setchelli, N sylvestris, N. tomentosa, N. tomentosiformis, N. undulata, and N.×sanderae*. Also of interest are *N. africana, N amplexicaulis, N. benavidesii, N bonariensis, N. debneyi, N. long ora, N maritina, N megalosiphon, N occidentalis, N paniculata, N. plumbaginifolia, N raimondii, N. rosulata, N. rustica, N simulans, N stocktonii, N suaveolens, N tabacum, N. umbratica, N velutina,* and *N wigandioides*. Other plants from the *Nicotiana* species include *N acaulis, N. acuminata, N. attenuata, N benthamiana, N cavicola, N clevelandii, N cordifolia, N corymbosa, N fragrans, N goodspeedii, N linearis, N miersii, N nudicaulis, N obtusifolia, N occidentalis* subsp. *Hersperis, N pauciflora, N petunioides, N quadrivalvis, N repanda, N rotundifolia, N solanifolia* and *N spegazzinii*. The *Nicotiana* species can be derived using genetic-modification or cross-breeding techniques (e.g., tobacco plants can be genetically engineered or crossbred to increase or decrease production of certain components or to otherwise change certain characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al.; and U.S. Pat. No. 7,230,160 to Benning et al.; US Patent Appl. Pub. No. 2006/0236434 to Conkling et al.; and PCT WO 2008/103935 to Nielsen et al.

The plant component or components from the *Nicotiana* species can be employed in an immature form. That is, the plant can be harvested before the plant reaches a stage normally regarded as ripe or mature. As such, for example, the plant can be harvested when the tobacco plant is at the point of a sprout, is commencing leaf formation, is commencing flowering, or the like.

The plant components from the *Nicotiana* species can be employed in a mature form. That is, the plant can be harvested when that plant reaches a point that is traditionally viewed as being ripe, over-ripe or mature. As such, for example, through the use of tobacco harvesting techniques conventionally employed by farmers, Oriental tobacco plants can be harvested, burley tobacco plants can be harvested, or Virginia tobacco leaves can be harvested or primed by stalk position.

After harvest, the plant of the *Nicotiana* species, or portion thereof, can be used in a green form (e.g., tobacco can be used without being subjected to any curing process). For example, tobacco in green form can be frozen, freeze-dried, subjected to irradiation, yellowed, dried, cooked (e.g., roasted, fried or boiled), or otherwise subjected to storage or treatment for later use. Such tobacco also can be subjected to aging conditions.

Pyrolysis is a thermochemical decomposition of organic material at elevated temperatures in the absence of oxygen (or any halogen). During a pyrolysis process, organic materials are transformed into gases, small quantities of liquid, and a solid residue containing carbon and ash. In various embodiments, pyrolysis temperatures in the range of about 500° C. to about 850° C. can be used. In a preferred embodiment, the tobacco material can be pyrolyzed at a temperature of about 700° C. Although the invention is not limited by any theory of operation, higher temperatures can reduce the yield of carbon material and lower temperatures can risk incomplete conversion. Accordingly, a balance can be achieved and the pyrolysis temperature can vary depending on the composition of the tobacco materials used as the carbon precursor.

The yield of pyrolyzed material from the plant components can vary. As used herein, the yield of the pyrolyzed material refers to the combined mass of carbon material and ash produced from pyrolysis of the tobacco material. For example, in certain embodiments, the yield of pyrolyzed material obtained is greater than about 15%, greater than about 20%, greater than about 25%, or greater than about 30% based on the dry weight of the initial harvested stalk and/or root. In a preferred embodiment, pyrolysis char yields of about 30% to about 40%, or about 32% to about 38% can be achieved when pyrolyzing fully dried tobacco material at about 700° C. In general, yield is dependent on a number of factors. For example, yield can depend on the quality of the tobacco plants. Poor quality plants/plant components or those that have been harvested very early or very late can comprise different amounts of extractable components. Yield can also depend on the pyrolysis temperature used. Yield can also vary as a result of other specific conditions used throughout the carbon material production process.

Pyrolyzed materials according to the invention, in certain embodiments, have a relatively high ash content as compared to carbon derived from certain conventional carbonaceous materials such as certain shell or wood-based carbon materials. In certain circumstances, the high ash content of the carbon can be very valuable, especially when the carbonized tobacco stalks and/or roots are used as a fuel source in such cigarettes known as heat-not-burn. The higher ash content allows the carbon fuel source to burn more evenly and reduces sparking during combustion. Additionally, the use of certain tobacco-derived carbon from stalks and roots containing a higher ash (or mineral content) may be more efficient for use in batteries, for example, where the mineral content is necessary for effective current flow.

A standard test method (ASTM D2866-11) can be used to determine the total ash content of a pyrolyzed carbon samples. As is known in the art, ash can comprise the mineral oxide constituents of activated carbon. It can typically be defined as a weight percent basis after a given amount of sample is oxidized. For example, pyrolyzed carbon materials derived from harvested tobacco stalk and/or root can have an ash content of about 2% to about 15%, or about 2% to about 10%, or about 5% to about 10% based on the total dry weight of the pyrolyzed tobacco materials (i.e., the solid residue remaining after pyrolysis). In various embodiments, the carbon materials derived from harvested tobacco stalk and/or root can have an ash content of about 15% or less, about 10% or less, or about 5% or less, based on the total dry weight of the pyrolyzed tobacco material (i.e., the solid residue remaining after pyrolysis). By comparison, pyrolyzed carbon materials derived from harvested tobacco stems can have an ash content of about 16% or greater or about 20% or greater based on the total dry weight of the pyrolyzed tobacco stems. As such, the percentage of actual carbon material obtained from pyrolyzed tobacco stems can be significantly less than the percentage of actual carbon material obtained from pyrolyzed tobacco roots and/or stalks.

The amount of ash can vary depending on the starting tobacco material. For example, for tobacco root-derived carbon, the amount of ash is often less than about 5% by dry weight of the pyrolyzed tobacco material, such as less than about 4% or less than about 3%. In another embodiment, for tobacco stalk-derived carbon, the amount of ash is often greater than about 5% by dry weight, such as greater than about 6%, greater than about 7%, or greater than about 8%.

In various embodiments of the present invention, the carbon material can optionally be activated. Activated carbon is a form of carbon with a random or amorphous structure that has been processed to have small, low-volume pores that increase the surface area available for adsorption or chemical reactions. Activated carbon can have a broad range of pore sizes. Surface area can be determined via Brunauer-Emmett-Teller (BET) Surface Area analysis, for example. BET analysis provides precise specific surface area evaluation of materials by nitrogen multilayer adsorption measured as a function of relative pressure using a fully automated analyzer. The technique encompasses external area and pore area evaluations to determine the total specific surface area in $m^2/g$. Many conventional activated carbons can have a surface area ranging from about 500 to about 1,200 $m^2/g$, or about 500 $m^2/g$ to about 1000 $m^2/g$, or about 600 $m^2/g$ to about 800 $m^2/g$. Activated carbon can have a surface area of at least about 600 $m^2/g$, or at least about 700 $m^2/g$, or at least about 1000 $m^2/g$. In some instances, a carbon material can be partially activated. Typically, conventional partially activated carbon materials can have a surface area of about 400 $m^2/g$ or higher.

Carbon can be activated via steam activation, which operates by the coal/gas reaction in which carbon is removed from incipient nucleation sites and micro or meso pores are grown, according to the formula below.

$$C + H_2O \rightarrow CO + H_2$$

In various embodiments, a modified steam activation process can be used, wherein water vapor can be directly injected into the furnace (e.g., at about 100 torr and 52° C.) such that water is available for the reaction above. In some embodiments, the process can include saturating nitrogen in water prior to flowing it through the furnace, combined pre-saturation of the char prior to insertion in the furnace, and/or a back pressure to maintain an increased level of water vapor partial pressure.

In some embodiments, carbon derived from tobacco stalks and/or roots can be activated via steam activation at a temperature of about 850° C. These activated carbon materials can have a BET surface area of about 300 $m^2/g$ to about 600 $m^2/g$, or about 400 $m^2/g$ to about 585 $m^2/g$, or about 430 $m^2/g$ to about 580 $m^2/g$, for example.

In some embodiments of the present invention, alkali activation can be used to activate the carbon materials. In certain embodiments, the alkali activation process can include fluxing the char with KOH in mass ratios in the range of 1:1 to 3:1 KOH/char at a high temperature (e.g., about 850° C.) to produce water soluble alkali silicates from the ash oxides, which can then be removed by water extraction. These activated carbon materials can have a BET surface area of about 500 $m^2/g$ to about 1000 $m^2/g$, or about 575 $m^2/g$ to about 950 $m^2/g$, or about 700 $m^2/g$ to about 900 $m^2/g$, for example.

Carbon materials generated according to the present invention can be useful in various products and processes such as, but not limited to, gas purification, decaffeination, denicotinization, gold purification, metal extraction, sound absorption, water purification, groundwater remediation, spill cleanup, medicine, sewage treatment, air filtration (e.g., air filters in gas masks and respirators and filters for compressed air), and many other adsorption applications. Tobacco-derived carbon can also be used as a black pigment for printing, for example.

Carbon materials generated according to the process of the invention are useful as components incorporated into tobacco products, for example. The tobacco product to which the carbon material of the invention are added can vary, and can include any product configured or adapted to deliver tobacco or some component thereof to the user of the product. Exemplary tobacco products include smoking articles (e.g., cigarettes), smokeless tobacco products, and aerosol-generating devices that contain a tobacco material or other plant material that is not combusted during use. The incorporation of the carbon material of the invention into a tobacco product may involve use of the carbon materials in an activated or a non-activated form.

Figure 4:
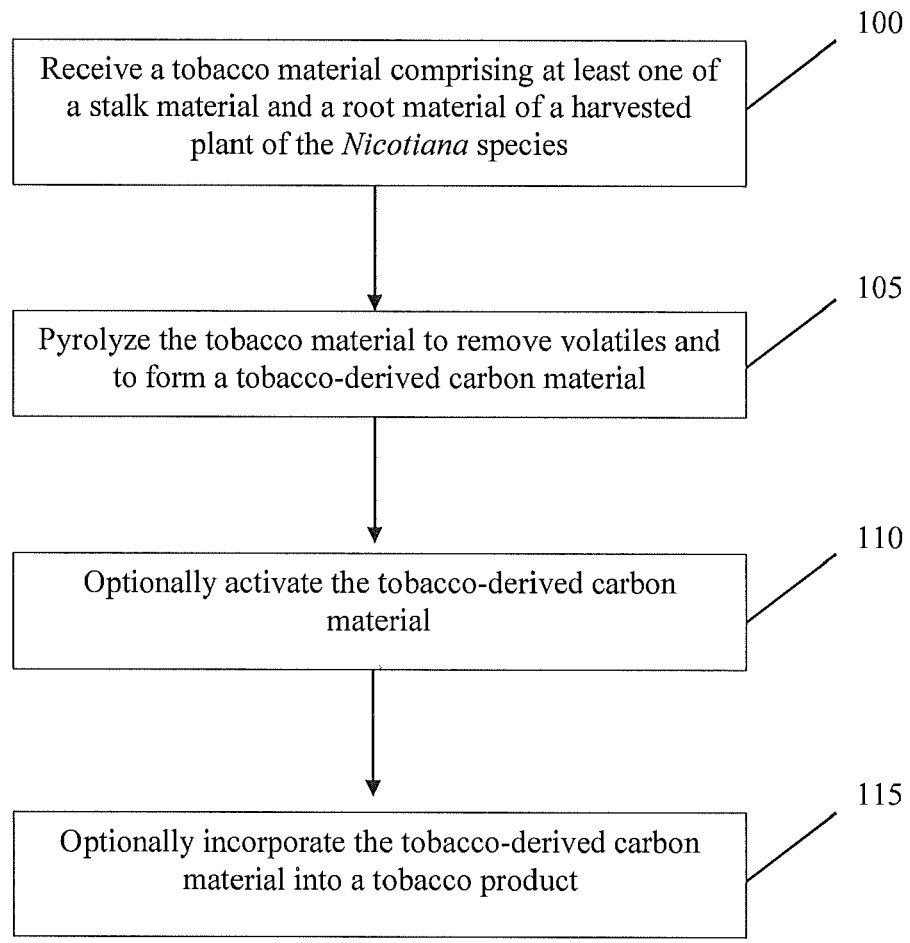
FIG. 4 is a flow chart describing methods of forming carbonaceous materials from tobacco biomass materials.

FIG. 4 illustrates a process for forming a carbon material derived from tobacco and using such a material in a tobacco product. As shown, step 100 involves receiving a root or stalk material from a harvested plant of the *Nicotiana* species. At step 105, the tobacco material is pyrolyzed to form a carbon material. Thereafter, at step 110, the tobacco-derived carbon is optionally activated as described herein. Finally, if desired, the carbon material can be incorporated into any of the tobacco products noted herein at step 115.

In various embodiments, the activated carbon materials of the invention can be incorporated into a cigarette filter in the form of an adsorbent therein. Referring to FIG. 1, there is shown a smoking article 10 in the form of a cigarette and possessing certain representative components of a smoking article that can contain the tobacco-derived carbon material of the present invention. The cigarette 10 includes a generally cylindrical rod 12 of a charge or roll of smokable filler material (e.g., about 0.3 to about 1.0 g of smokable filler material such as tobacco material) contained in a circumscribing wrapping material 16. The rod 12 is conventionally referred to as a "tobacco rod." The ends of the tobacco rod 12 are open to expose the smokable filler material. The cigarette 10 is shown as having one optional band 22 (e.g., a printed coating including a film-forming agent, such as starch, ethylcellulose, or sodium alginate) applied to the wrapping material 16, and that band circumscribes the cigarette rod in a direction transverse to the longitudinal axis of the cigarette. The band 22 can be printed on the inner surface of the wrapping material (i.e., facing the smokable filler material), or less preferably, on the outer surface of the wrapping material.

At one end of the tobacco rod 12 is the lighting end 18, and at the mouth end 20 is positioned a filter element 26. The filter element 26 positioned adjacent one end of the tobacco rod 12 such that the filter element and tobacco rod are axially aligned in an end-to-end relationship, preferably abutting one another. Filter element 26 may have a generally cylindrical shape, and the diameter thereof may be essentially equal to the diameter of the tobacco rod. The ends of the filter element 26 permit the passage of air and smoke therethrough. A plug wrap 28 enwraps the filter element and a tipping material (not shown) enwraps the plug wrap and a portion of the outer wrapping material 16 of the rod 12, thereby securing the rod to the filter element 26.

Figure 2:
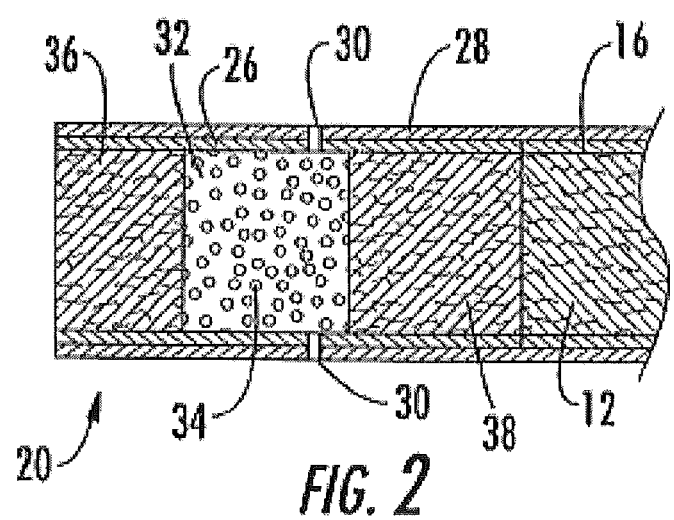
FIG. 2 is a cross-sectional side view of a cigarette of the invention wherein the filter element comprises an adsorbent material positioned within a compartment therein.

FIG. 2 illustrates a filter element of the invention, which is adapted for use with smoking articles such as cigarettes. The filter element of the invention typically comprises multiple longitudinally extending segments. Each segment can have varying properties and may include various materials capable of filtration or adsorption of particulate matter and/or vapor phase compounds. Typically, the filter element of the invention includes 2 to 6 segments, frequently 2 to 4 segments. In one preferred embodiment, the filter element includes a mouth end segment, a tobacco end segment and a compartment therebetween. This filter arrangement is sometimes referred to as a "compartment filter" or a "plug/space/plug" filter. The compartment may be divided into two or more compartments as described in greater detail below.

In various embodiments, the filter element can comprise an adsorbent 34 in the form of an activated carbon material derived from tobacco stalks and/or roots and capable of removing at least one gas phase component of mainstream smoke is incorporated into the filter element. The amount of adsorbent 34 within the filter element typically ranges from about 50 to about 250 mg, often about 80 to about 150 mg, and frequently about 90 to about 120 mg. The level of activity of the carbon may vary. Typically, the carbon has an activity of about 60 to about 150 Carbon Tetrachloride Activity (i.e., weight percent pickup of carbon tetrachloride). Activated carbon most useful herein consists primarily of carbon, and preferably has a carbon content above about 80 weight percent, and more preferably above about 90 weight percent.

The form of the adsorbent 34 may vary. Typically, the adsorbent 34 is used in granular or particulate solid form having a particle size of between about 8×16 mesh to about 30×70 mesh using the U.S. sieve system. However, smaller or larger particles could be used without departing from the invention. The terms "granular" and "particulate" are intended to encompass both non-spherical shaped particles and spherical particles, such as so-called "beaded carbon" described in WO 03/059096 A1, which is incorporated by reference herein.

The manner in which the adsorbent 34 is incorporated into the filter element may vary. For example, granulated adsorbent can be placed in a compartment within the filter element. However, the adsorbent 34 could also be imbedded or dispersed within a section of filter material, such as a fibrous filter material (e.g., cellulose acetate tow), or incorporated into a paper, such as the carbon-containing gathered paper described in U.S. Pat. No. 5,360,023 to Blakley et al. In addition, an adsorbent material 34 can be placed both in a compartment and imbedded in one or more of the sections of filter material, and the adsorbent material in the compartment and the adsorbent imbedded or dispersed in the filter material can be the same or different.

For example, FIG. 2 illustrates one embodiment of the filter element 20 of the invention comprising a first section of filter material 36, such as a fibrous filter material (e.g., plasticized cellulose acetate tow) and a second section of filter material 38 spaced apart from the first section of filter material. As shown, the first section of filter material 36 is positioned at the mouth end of the filter element 20 and the second section of filter material 38 is positioned proximal to the tobacco rod 12. The space between the first section of filter material 36 and the second section of filter material 38 define a compartment 32. At least a portion of the compartment 32 contains an adsorbent material 34, preferably in granular form. Typically, substantially the entire compartment 32 contains adsorbent 34. Alternative filter arrangements are disclosed in U.S. Pat. Publ. No. 2012/0037173 to Clark et al., for example, which is herein incorporated by reference in its entirety.

As shown, the filter element 20 can include ventilation holes 30 that extend through the tipping paper 28 and the plug wrap 26 and, thus, provide air dilution of mainstream smoke. The ventilation holes 30 may be configured as a single line of perforations extending circumferentially around the filter element 20 or may comprise several lines of perforations. As would be understood, the exact count and size of the ventilation holes 30 will vary depending on the desired level of air dilution.

The exact distance of the ventilation holes 30 from the end of the filter element 20 proximal to the tobacco rod 12 will vary depending on the length of the individual segments of the filter, such as the segment 38 proximal to the tobacco rod. In certain embodiments, the ventilation holes 30 are about 10 to about 22 mm from the tobacco rod 12, and typically, when the ventilation holes are overlying the adsorbent-containing compartment 32, the holes are within about 5 mm of the section of filter material 38 proximal to the tobacco rod, preferably within about 2 mm.

In some embodiments, the tobacco-derived carbon material can be mixed with other carbonaceous materials. Other carbonaceous materials can be provided by carbonizing or pyrolyzing bituminous coal, tobacco material, softwood pulp, hardwood pulp, coconut shells, almond shells, grape seeds, walnut shells, macadamia shells, kapok fibers, cotton fibers, cotton linters, and the like. Carbon from almond shells, grape seeds, walnut shells, and macadamia nut shells are particularly preferred and are believed to provide greater vapor phase removal of certain compounds as compared to coconut shell carbon. Examples of suitable carbonaceous materials are activated coconut hull based carbons available from Calgon Corp. as PCB and GRC-11, coal-based carbons available from Calgon Corp. as S-Sorb, BPL, CRC-11F, FCA and SGL, wood-based carbons available from Westvaco as WV-B, SA-20 and BSA-20, carbonaceous materials available from Calgon Corp. as HMC, ASC/GR-1 and SC II, and Witco Carbon No. 637. Other carbonaceous materials are described in U.S. Pat. No. 4,771,795 to White, et al. and U.S. Pat. No. 5,027,837 to Clearman, et al.; and European Patent Application Nos. 236,922; 419,733 and 419,981. Certain carbonaceous materials can be impregnated with substances, such as transition metals (e.g., silver, gold, copper, platinum, palladium), potassium bicarbonate, tobacco extracts, polyethyleneimine, manganese dioxide, eugenol, and 4-ketononanoic acid. The carbon composition may also include one or more fillers, such as semolina.

In various embodiments, the carbon materials of the invention can be incorporated into a smoking article that employs sources of heat other than tobacco cut filler (e.g., carbonaceous fuel elements), which are commonly referred to as "heat-not-burn" smoking articles. In particular, carbon materials derived from tobacco roots and/or stalks can be used as carbonaceous fuel elements in a heat-not-burn smoking article.

Figure 3:
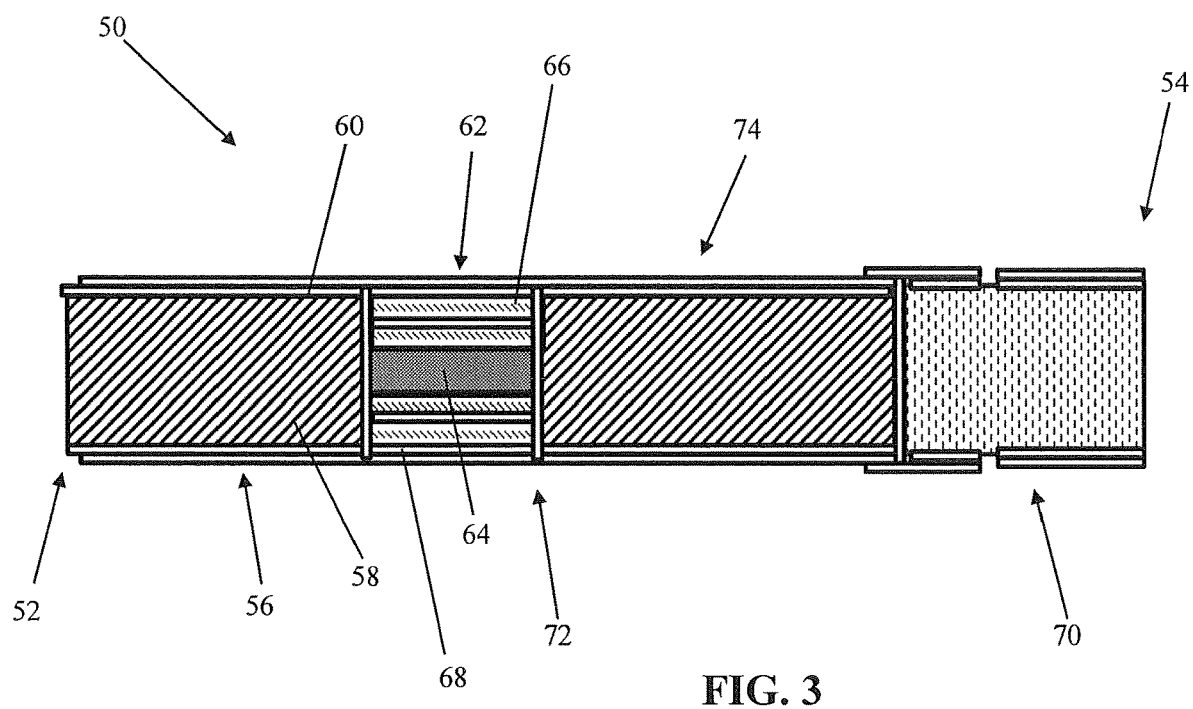
FIG. 3 is a longitudinal cross-sectional view of a representative "heat-not-burn" smoking article comprising a combustible carbonaceous material therein.

As illustrated in FIG. 3, for example, the heat-not-burn smoking article 50 can have a rod-like shape, and include a lighting end 52 and a mouth end 54. See, e.g., the smoking article described in U.S. Pat. No. 8,464,726 to Sebastian et al., which is herein incorporated by reference in its entirety. At the lighting end 52 is optionally positioned a longitudinally extending, generally cylindrical smokable lighting end segment 56, incorporating smokable material 58. A representative smokable material 58 can be a plant-derived material (e.g., tobacco material in cut filler form). An exemplary cylindrical smokable lighting end segment 56 includes a charge or roll of the smokable material 58 (e.g., tobacco cut filler) wrapped or disposed within, and circumscribed by, a paper wrapping material 60. As such, the longitudinally extending outer surface of that cylindrical smokable lighting end segment 56 is provided by the wrapping material 60. Preferably, both ends of the segment 56 are open to expose the smokable material 58. The smokable lighting end segment 56 can be configured so that smokable material 58 and wrapping material 60 each extend along the entire length thereof.

Located downstream from the smokable lighting end segment 56 is a longitudinally extending, generally cylindrical heat generation segment 62. The heat generation segment 62 can be located at the lighting end 52 of the heat-not-burn smoking article 50 such that heat generation segment 62 is exposed for lighting. The heat generation segment 62 includes a heat source 64 circumscribed by insulation 66, which may be coaxially encircled by wrapping material 68. The heat source can be in the form of a combustible carbonaceous material comprising the tobacco-derived carbon materials described herein. The relatively high ash content of the tobacco-derived carbon materials described herein may be useful for lightability and/or other burn characteristics. The ash content of the tobacco-derived carbon can have a relatively high ash content as compared to certain shell or wood-based carbon used in conventional heat-not-burn products. As discussed above, the higher ash content can allow the carbon fuel source to burn more evenly and reduces sparking during combustion, for example. This can reduce the need to add metals to the carbon material in an attempt to improve lightability and sparking during use, for example. It is not necessary to activate the tobacco-derived carbon material for this use.

The heat source 64 may include a combustible fuel element that has a generally cylindrical shape. The heat source 64 preferably is configured to be activated by combustion of the smokable material 58. Ignition and combustion of the smoking material preferably provide a user with a desirable experience (with respect at least to flavor and time taken to light the smoking article 50). The heat generated as the smokable material is consumed most preferably is sufficient to ignite or otherwise activate the heat source 64.

Combustible carbonaceous materials generally have high carbon contents. Carbonaceous materials derived from tobacco stalks and/or roots can have carbon contents of greater than about 60 percent, generally greater than about 70 percent, often greater than about 80 percent, and frequently greater than about 90 percent, on a dry weight basis. Fuel elements can incorporate components other than combustible carbonaceous materials (e.g., tobacco components, such as powdered tobaccos or tobacco extracts; flavoring agents; salts, such as sodium chloride, potassium chloride and sodium carbonate; heat stable graphite fibers; iron oxide powder; glass filaments; powdered calcium carbonate; alumina granules; ammonia sources, such as ammonia salts; and/or binding agents, such as guar gum, ammonium alginate and sodium alginate). A representative fuel element has a length of about 12 mm and an overall outside diameter of about 4.2 mm. A representative fuel element can be extruded or compounded using a ground or powdered carbonaceous material, and has a density that is greater than about 0.5 g/cm$^3$, often greater than about 0.7 g/cm$^3$, and frequently greater than about 1 g/cm$^3$, on a dry weight basis. See, for example, the types of fuel element components, formulations and designs set forth in U.S. Pat. Nos. 5,178,167 and 5,551,451 to Riggs et al., and U.S. Pat. App. Pub. No. 2009/0090373 to Borschke et al., which are incorporated herein by reference in their entirety.

Another embodiment of a fuel element 64 may include a foamed carbon monolith formed in a foam process of the type disclosed in U.S. Pat. App. Pub. No. 2008/0233294 to Lobovsky, which is incorporated herein by reference. One example is a foamed carbon monolith available from Sulzer AG using the Optifoam™ system (which may also be used in the manufacture of other foamed monoliths and foamed materials wherever such materials are described herein, all within the scope of the present invention). This embodiment may provide advantages with regard to reduced time taken to ignite the heat source, as a foamed carbon monolith includes small open spaces not occupied with the organics and other potential sources of undesirable outgassing or pyrolysis products present in previous foamed compositions. In another embodiment, the fuel element 64 may be co-extruded with a layer of insulation 66, thereby reducing manufacturing time and expense. Still other embodiments of fuel elements may include carbon fibers of the type described in U.S. Pat. No. 4,922,901 to Brooks et al, or other heat source embodiments such as is disclosed in U.S. Pat. App. Pub. No. 2009/0044818 to Takeuchi et al., each of which is incorporated herein by reference.

Fuel elements of the heat generation segment may vary. Suitable fuel elements, and representative components, designs and configurations thereof, and manners and methods for producing those fuel elements and the components thereof, are set forth in U.S. Pat. No. 4,714,082 to Banerjee et al.; U.S. Pat. No. 4,756,318 to Clearman et al.; U.S. Pat. No. 4,881,556 to Clearman et al.; U.S. Pat. No. 4,989,619 to Clearman et al.; U.S. Pat. No. 5,020,548 to Farrier et al.; U.S. Pat. No. 5,027,837 to Clearman et al.; U.S. Pat. No. 5,067,499 to Banerjee et al.; U.S. Pat. No. 5,076,297 to Farrier et al.; U.S. Pat. No. 5,099,861 to Clearman et al.; U.S. Pat. No. 5,105,831 to Banerjee et al.; U.S. Pat. No. 5,129,409 to White et al.; U.S. Pat. No. 5,148,821 to Best et al.; U.S. Pat. No. 5,156,170 to Clearman et al.; U.S. Pat. No. 5,178,167 to Riggs et al.; U.S. Pat. No. 5,211,684 to Shannon et al.; U.S. Pat. No. 5,247,947 to Clearman et al.; U.S. Pat. No. 5,345,955 to Clearman et al.; U.S. Pat. No. 5,469,871 to Barnes et al.; U.S. Pat. No. 5,551,451 to Riggs; U.S. Pat. No. 5,560,376 to Meiring et al.; U.S. Pat. No. 5,706,834 to Meiring et al.; and U.S. Pat. No. 5,727,571 to Meiring et al.; and U.S. Pat. App. Pub. No. 2005/0274390 to Banerjee et al.; which are incorporated herein by reference. Conventional carbonaceous fuel elements include the type that have been incorporated within those cigarettes commercially marketed under the trade names "Premier" and "Eclipse" by R. J. Reynolds Tobacco Company. See also the "Steam Hot One" cigarette marketed by Japan Tobacco Inc.

During use, the smoker lights the lighting end 52 of the smoking article 50 using a match or cigarette lighter, in a manner similar to the way that conventional smoking articles are lit. As such, the optional smokable material 58 of the smokable lighting end segment 56 begins to burn. The mouth end 54 of the smoking article 50 is placed in the lips of the smoker. Thermal decomposition products (e.g., components of tobacco smoke) generated by the burning smokable material 58 are drawn through the smoking article 50, through the filter element 70, and into the mouth of the smoker. That is, when smoked, the smoking article yields visible mainstream aerosol that resembles the mainstream tobacco smoke of traditional cigarettes that burn tobacco cut filler.

Burning of the smokable lighting end segment 56 heats the fuel element 64 of the heat generation segment 62 such that it preferably will be ignited or otherwise activated (e.g., begin to burn). Alternatively, when the fuel element is positioned at the lighting end 52 of the smoking article 50, the fuel element is directly lit by the smoker using a match or a cigarette lighter. The heat source 64 within the aerosol-generation system 72 will burn, and provide heat to volatilize aerosol-forming material within the aerosol-generating segment 74 as a result of the heat exchange relationship between those two segments. Preferably, the components of the aerosol-generating segment 74 do not experience thermal decomposition (e.g., charring or burning) to any significant degree. Volatilized components are entrained in the air that is drawn through the aerosol-generating region 74. The aerosol so formed will be drawn through the filter element 70, and into the mouth of the smoker.

EXPERIMENTAL

Aspects of the present invention are more fully illustrated by the following examples, which are set forth to illustrate certain aspects of the present invention and are not to be construed as limiting thereof.

Example 1

Chemical analyses of stalk and stem samples for both burley and flue-cured tobaccos are compared. Standard methods of analysis well known in the tobacco industry are used. Values for burley and flue-cured roots are also analyzed for comparison as alternative sources of biomass material.

The differences between burley stalks and roots and burley stems are very similar to the differences between flue-cured stalks and roots and flue-cured stems. For instance, total alkaloids are higher for burley stem (0.887%) versus burley stalk (0.327%) and burley root (0.147%); and for flue-cured stem (1.096%) versus flue-cured stalk (0.387%) and flue-cured root (0.398%), The magnitude of the differences is also similar. The percentages are based on the total weight of alkaloids compared to the total weight of the tobacco sample examined.

Comparable trends are found for total elements, organic acids, sugars, ash and nitrate. For all these analyses, stems are significantly higher than stalks and/or roots, except for sugars where Burley and flue-cured roots have higher levels of sugar versus stem and stalk samples. Amino acids and chloride appear to be relatively the same in both stalks and stems, although burley stalks have a higher aspartic acid level than burley stem (5.250 µg/mg to 2.959 µg/mg) and flue-cured stem has a higher chloride level than flue-cured stalk (3.00% vs. 0.86%). Amino acids and chloride appear to be at lower levels in root samples than in either stem or stalk samples.

There is a dramatic difference in water soluble extractives between stalk and stem. Stems approach 40% extractables whereas stalks are in the range of 15% to 20%. These percentages are based on the total weight of extractables compared to the total weight of the tobacco sample examined. The extractives weight is the amount of material removed by extraction. Extractables are all materials that are removed from the sample by the particular solvent being used, such as water.

Total cellulosic components including cellulose, hemicellulose, starch and lignin are significantly higher in tobacco stalks than in tobacco stems. The cellulose, hemicellulose, and lignin in roots are similar, but not identical, to that of stalk. As such, tobacco stalks and roots provide a higher yield of cellulose material than tobacco stems.

Ash values are much higher in stem than in stalks and/or roots (3× in burley and almost 4× in flue-cured) which is consistent with the higher levels of elements measured. This is also consistent with the higher level of carbon measured in stalks and roots (about 40% or greater) versus stems (less than about 40%).

Example 2

Samples of burley stalk, burley root, flue-cured stalk, flue-cured root, and extracted cured tobacco stalk are pyrolyzed.

The starting stalk and root samples are first weighed and then placed in a tube furnace. The tube furnace is fitted with a steel tube such that an inert gas such as nitrogen can be flowed over the sample(s) during heating. The tube furnace is started. The heating rate is 300° C. per hour with a max temperature of 700° C. Dwell time is 1 hour. The cooling rate is 300° C. per hour. 2 liters per minute of Nitrogen gas is flowed over the samples during heating. The pressure in the tube furnace is 5 psi. During heating, the volatile products are exhausted and condensed in a condensing unit. Non condensable gases are vented to the stack exhaust. After heating is complete, the resulting char materials are weighed and yield is recorded.

If possible, multiple samples of each tobacco starting material are pyrolyzed. After pyrolysis, samples of extracted cured tobacco stalk exhibit a weight loss of 70.54% and 71.35%, based on dry weights of the pyrolyzed material compared to the starting material dry weight. Samples of burley stalk exhibit a weight loss of 68.38% and 68.01%. A sample of flue-cured stalk exhibits a weight loss of 68.56%. Samples of burley root exhibit a weight loss of 71.38% and 71.94%. Samples of flue-cured root exhibit a weight loss of 71.08% and 71.23%.

Example 3

The pyrolyzed samples of burley stalk, burley root, flue-cured stalk, flue-cured root, and extracted cured tobacco stalk from Example 2 above are activated using a steam activation procedure. This process is capable of producing at least moderately active carbons.

A tube furnace is modified for high pressure steam activation. The exhaust to the heat exchange is closed by using a stopper or the like to seal the exit of the exhaust chamber. Gas is run through a bubbler by connecting a gas line onto the inlet of the bubbler and a gas outlet line from the bubbler to the end cap of the tube furnace. A water trap exhaust valve is opened so that the gauge reads between about 3-6 psi once the cycle starts and so that there is enough water in the water trap exhaust so that the exhaust bubbles.

To activate the pyrolyzed carbon samples, the bubbler is filed with 2 liters of distilled water and placed on a hot plate. The bubbler is allowed to dwell at about 90° C. Each precursor sample (the pyrolyzed carbon samples) are soaked in the distilled water for 20 minutes or until fully saturated. The wet precursor is placed in a screen basket and both ends of the basket are plugged with steel wool. The screen basket is then placed in the center of the tube furnace and the end cap that plugs the exhaust and has the gas line attached is inserted. The gas valve is opened (bubbles should appear inside the bubbler) and the furnace is started. The heat rate is 300° C. per hour with a max temperature of 850° C. (900° C. for steel tube furnace). The dwell time is one hour. The cooling rate is 300° C. per hour. 2 liters per minute of Nitrogen gas is flowed over the samples during heating. The pressure in the tube furnace is 20 psi. Once the furnace is cooled to room temperature, the screen basket is removed and the activated carbon is weighed. The activated carbon is then submitted to BET surface area measurement.

The extracted cured tobacco stalk has a BET surface area of 581 $m^2/g$. The flue-cured stalk has a BET surface area of 300 $m^2/g$. The burley root has a BET surface area of 435 $m^2/g$. The flue-cured root has a BET surface area of 577 $m^2/g$. Steam activation was generally successful in producing BET surface area results within acceptable ranges for partially activated carbon. In general, typical BET surface area values for partially activated carbon are about 400 $m^2/g$ or greater.

Example 4

The pyrolyzed samples of burley stalk, burley root, flue-cured stalk, flue-cured root, and extracted cured tobacco stalk from Example 2 above are activated using an alkali activation procedure. This process is capable of producing high grade activated carbon.

Sufficient amounts of KOH and precursor samples (i.e., samples of the pyrolyzed tobacco materials) are weighed such that a 2:1 weight ratio of KOH:precursor is prepared. The KOH and precursor is crushed and mixed with a mortar and pestle. The mixture is placed in a tube furnace and heated to the activation temperature. The heat rate is 300° C. per hour with a max temperature of 850° C. (900° C. for steel tube furnace). The dwell time is one hour. The cooling rate is 300° C. per hour. 2 liters per minute of Nitrogen gas is flowed over the samples during heating. The pressure in the tube furnace is 5 psi.

Once the furnace is cooled to room temperature, activated carbon is neutralized. 200 mL of 0.1 M HCl aqueous solution is prepared by mixing 1.7 mL of HCl (37% solution) with 200 mL of distilled water. The KOH activated carbon is soaked in the 0.1 M HCl for at least 40 minutes. Using a filter and a funnel, the HCl is separated from the activated carbon. The neutralized carbon product is then soaked in a beaker with distilled water for at least 40 minutes. Using a clean filter and funnel, the activated carbon is separated from the distilled water. The wash water is retained for a pH measurement and this process is repeated until the pH of the wash water is in the range of 6-7. Once the desired pH is achieved, the filter with the activated carbon on it is dried in a dryer at 110° C. for at least 2 hours. The activated carbon is then submitted to BET surface area measurement.

The extracted cured tobacco stalk has a BET surface area of 575 $m^2/g$. The burley stalk has a BET surface area of 918 $m^2/g$. The flue-cured stalk has a BET surface area of 783 $m^2/g$. The burley root has a BET surface area of 872 $m^2/g$. The flue-cured root has a BET surface area of 746 $m^2/g$.

Alkali activation was successful for all tobacco root and stalk samples and the BET surface area results are within acceptable ranges for partially activated carbon. In general, typical BET surface area values for partially activated carbon are about 400 $m^2/g$ or greater. Generally, BET surface area values for fully activated carbon are about 1000 $m^2/g$ or greater. In addition, the carbon materials derived from the burley stalk and burley root samples exhibit a higher surface area after activation than the carbon materials derived from the flue-cured stalk and flue-cured root samples.

Example 5

Several conventional carbonaceous materials are pyrolyzed for comparison purposes. Specifically, bituminous coal, coconut shell and walnut shell are pyrolyzed according to the procedure outlined in Example 2 above, except the max temperature is at 500° C. These pyrolyzed samples and samples of the burley stalk, burley root, flue-cured stalk, and flue-cured root pyrolyzed according to Example 2 above are analyzed for ash content.

To compare rate and degree to which various precursors decompose in a nitrogen atmosphere, samples are analyzed using thermal gravimetric analysis. Each sample is heated in nitrogen to a target pyrolysis temperature where a one hour soak is initiated. At the target temperature, the atmosphere is changed to air to oxidize the carbon and reveal the true ash content. A standard test method (ASTM D2866-11) is used to determine the total ash content of a pyrolyzed carbon samples.

The pyrolyzed carbon materials derived from burley stalk have an ash content of 8.65%. The pyrolyzed carbon materials derived from flue-cured stalk have an ash content of 5.7%. The pyrolyzed carbon materials derived from burley root have an ash content of 2.04%. The pyrolyzed carbon materials derived from flue-cured root have an ash content of 2.62%. The pyrolyzed carbon materials derived from bituminous coal have an ash content of 11.5%. The pyrolyzed carbon materials derived from coconut shell have an ash content of 4.1%. The pyrolyzed carbon materials derived from walnut shell have an ash content of 6.6%.

A lower ash content can be indicative of a higher carbon content in the precursor. This in turn can result in a larger (i.e., more efficient) carbon yield after pyrolysis. However, a higher ash content can result in advantageous lighting and burning characteristics in a combustible fuel element for use in, for example, a heat-not-burn tobacco product. This example shows that tobacco stalk and root have an ash content that is either somewhat lower (e.g., tobacco root-derived carbon) or somewhat higher (e.g., tobacco stalk-derived carbon) than certain conventional sources of carbon. Thus, where the primary factor in selecting a material for carbon formation is carbon yield, tobacco root is particularly useful. Yet, for certain applications where ash content can be beneficial (e.g., heat-not-burn fuel elements), tobacco stalk-derived carbon may be advantageous.

Example 6

Several conventional carbonaceous materials are activated for comparison purposes. Specifically, bituminous coal, coconut shell and walnut shell are activated according to the procedures outlined in Examples 3 and 4 above. Coconut shell carbon (AC 1230C) has a BET value of 1343 $m^2/g$. Bituminous carbon (VC410) has a BET value of 997 $m^2/g$. This shows that activated carbon derived from tobacco stalk and/or root has a BET surface value comparable to conventional carbon materials.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of forming a tobacco product comprising a carbon material derived from the stalk or roots of a plant of the *Nicotiana* species, comprising:
    i) receiving a tobacco material comprising at least one of a stalk material and a root material of a harvested plant of the *Nicotiana* species;
    ii) pyrolyzing the tobacco material to remove volatiles and to form a tobacco-derived carbon material;
    iii) activating the tobacco-derived carbon material; and
    iv) incorporating the activated tobacco-derived carbon material into a tobacco product, wherein the tobacco product is a smoking article, wherein the smoking article comprises a filter element, and wherein the activated tobacco-derived carbon material is located within the filter element;
    wherein the tobacco material comprises at least about 90 percent by dry weight of the root material of a harvested plant of the *Nicotiana* species; and
    wherein the tobacco-derived carbon material comprises an ash content of about 5% or less by dry weight.

2. The method of claim 1, wherein the tobacco material is formed by grinding at least one of the stalk material and the root material of a harvested plant of the *Nicotiana* species to form a particulate material.

3. The method of claim 1, wherein the tobacco material comprises at least 40 dry weight percent carbon.

4. The method of claim 1, wherein pyrolyzing the tobacco material results in a yield of the tobacco-derived carbon material of about 25 percent or greater based on the initial dry weight of the tobacco material.

5. The method of claim 1, wherein the tobacco-derived carbon material is activated through at least one of alkali activation and steam activation.

6. The method of claim 5, wherein the tobacco-derived carbon material is activated by fluxing a tobacco-derived char with an alkali metal compound in a mass ratio of about 1:1 to about 3:1 alkali metal compound/char at a temperature of greater than about 800° C.

7. The method of claim 1, wherein the activated tobacco-derived carbon material has a surface area of at least about 400 $m^2/g$.

8. The method of claim 7, wherein the activated tobacco-derived carbon material has a surface area of about 500 to about 1,200 $m^2/g$.

* * * * *